(12) United States Patent
Souverein

(10) Patent No.: US 11,536,146 B2
(45) Date of Patent: Dec. 27, 2022

(54) GUIDE VANE ARRANGEMENT FOR USE IN A TURBINE

(71) Applicant: ArianeGroup GmbH, Taufkirchen (DE)

(72) Inventor: Louis Souverein, Riemerling (DE)

(73) Assignee: ArianeGroup GmbH, Taufkirchen (DE)

(*) Notice: Subject to any disclaimer, the term of this patent is extended or adjusted under 35 U.S.C. 154(b) by 707 days.

(21) Appl. No.: 16/410,329

(22) Filed: May 13, 2019

(65) Prior Publication Data
US 2019/0345834 A1 Nov. 14, 2019

(30) Foreign Application Priority Data
May 14, 2018 (EP) .................................... 18172093

(51) Int. Cl.
*F01D 9/04* (2006.01)

(52) U.S. Cl.
CPC .......... *F01D 9/041* (2013.01); *F05D 2220/30* (2013.01); *F05D 2230/30* (2013.01); *F05D 2240/121* (2013.01); *F05D 2240/122* (2013.01)

(58) Field of Classification Search
CPC .......... F01D 9/041; F01D 5/146; F01D 5/147; F01D 5/141; F05D 2240/121; F05D 2240/122; F05D 2220/30
See application file for complete search history.

(56) References Cited

U.S. PATENT DOCUMENTS 901,228 A * 10/1908 Collier .................... F01D 5/142
  415/93
2,914,296 A * 11/1959 Bloomberg ............. F01D 5/141
  415/68

(Continued)

FOREIGN PATENT DOCUMENTS

EP  1 674 664 A2  6/2006
EP  3 025 809 A1  6/2016

(Continued)

OTHER PUBLICATIONS

European Search Report issued in European counterpart application No. 18172093.9-1006 dated Nov. 16, 2018 (Seven (7) pages).

*Primary Examiner* — Kenneth Bomberg
*Assistant Examiner* — Adam W Brown
(74) *Attorney, Agent, or Firm* — Crowell & Moring LLP

(57) ABSTRACT

A guide vane arrangement configured for use in a turbo pump, wherein the guide vane arrangement includes a first guide vane and a second guide vane, wherein the second guide vane is arranged adjacent to the first guide vane such that a flow channel is defined between a leading surface of the first guide vane and a trailing surface of the second guide vane. The trailing surface of the second guide vane comprises a trailing portion which is arranged adjacent to a trailing edge of the second guide vane and which is arranged at a first angle with respect to a virtual plane defined by a trailing edge of the first guide vane and the trailing edge of the second guide vane, a leading portion which is arranged adjacent to a leading edge of the second guide vane and which is arranged at a second angle with respect to the virtual plane defined by the trailing edge of the first guide vane and the trailing edge of the second guide vane, the second angle being larger than the first angle, and an intermediate portion which is arranged between the trailing portion and the leading portion and which is arranged at a (Continued)

third angle with respect to the virtual plane defined by the trailing edge of the first guide vane and the trailing edge of the second guide vane, the third angle being smaller than the first angle.

19 Claims, 3 Drawing Sheets

(56) References Cited

U.S. PATENT DOCUMENTS

| | | | | |
|---|---|---|---|---|
| 4,609,328 A | * | 9/1986 | Cirrito | F04F 5/467 417/89 |
| 4,626,174 A | * | 12/1986 | Sato | F01D 5/141 415/181 |
| 5,073,335 A | * | 12/1991 | Townsend | F04D 15/0005 376/373 |
| 5,697,767 A | * | 12/1997 | Bissell | F04D 13/14 417/409 |
| 6,116,856 A | * | 9/2000 | Karadgy | F03D 1/0608 416/203 |
| 6,499,942 B1 | * | 12/2002 | Nonaka | F04D 29/324 416/243 |
| 7,195,456 B2 | * | 3/2007 | Aggarwala | F01D 5/141 415/208.2 |
| 8,337,164 B2 | * | 12/2012 | Ohbayashi | F04D 29/544 416/242 |
| 10,012,103 B2 | * | 7/2018 | Pachidis | F01D 17/14 |
| 2012/0210715 A1 | * | 8/2012 | Shibata | F01D 5/141 60/670 |
| 2018/0071822 A1 | * | 3/2018 | Vogt | B29C 64/153 |

FOREIGN PATENT DOCUMENTS

| | | |
|---|---|---|
| ER | 1 522 679 A2 | 4/2005 |
| GB | 1079606 A | 8/1967 |
| NL | 6604339 A | 10/1966 |

\* cited by examiner

GUIDE VANE ARRANGEMENT FOR USE IN A TURBINE

CROSS REFERENCE TO RELATED APPLICATIONS

This application claims priority under 35 U.S.C. § 119 from European Patent Application No. 18172093.9, filed May 14, 2018, the entire disclosure of which is herein expressly incorporated by reference.

BACKGROUND AND SUMMARY OF THE INVENTION

The invention relates to a guide vane arrangement for use in a turbine, a method of operating a guide vane arrangement, a method of manufacturing a guide vane arrangement and a turbine comprising a guide vane arrangement.

Turbines, such as, for example, turbines for use in turbo pumps typically are equipped with a guide vane arrangement or guide grid that is arranged upstream of a rotor of the turbine and serves to accelerate and deflect a fluid stream before the fluid stream is supplied to the rotor. In particular, the guide vane arrangement accelerates and deflects the fluid stream in such a manner that the fluid stream impinges on the rotor blades at an angle and at a flow speed that allows the rotor to operate at its design conditions.

Guide vane arrangements for use in turbo pump turbines are produced in a multi-stage production process. In the a first step, the guide vanes as well as a carrier component of the guide vane arrangement such as, for example, a tube body of a turbine manifold pipe or a turbine housing are cast or machined separately from one another. Thereafter, the individual components are welded to one another.

The invention is directed to the object to specify a guide vane arrangement which, despite its complex geometry, can be produced in a simple and cost-effective manner. Furthermore, the invention is directed to the object to provide a method of operating a guide vane arrangement of this kind. Moreover, the invention is directed to the object to provide a method that allows a guide vane arrangement of this kind to be manufactured in a simple and cost-effective manner. Finally, the invention is directed to the object to specify a turbine which is equipped with a guide vane arrangement of this kind.

A guide vane arrangement which is in particular suitable for use in a turbo pump comprises a first guide vane and a second guide vane. The second guide vane is arranged adjacent to the first guide vane such that a flow channel is defined between a leading surface of the first guide vane and a trailing surface of the second guide vane. Preferably, the guide vane arrangement comprises a plurality of first and second guide vanes that may, for example, be arranged so as to define a rotation-symmetric guide grid. The guide grid may be installed in a turbine manifold upstream of a turbine rotor and may extend in a rotation-symmetrical manner around a rotor shaft. The guide vanes of the guide vane arrangement serve to control, i.e. deflect and accelerate, a fluid flow to be supplied to the turbine rotor via the flow channels defined between adjacent guide vanes in such a manner that the fluid flow impinges on rotor blades of the rotor at a desired speed and at a desired angle.

Preferably, the first and the second guide vane have an identical shape. Thus, a guide vane which herein is designated as a "first guide vane" with respect to one adjacent "second guide vane" also constitutes a "second guide vane" with respect to another adjacent "first guide vane".

The trailing surface of the second guide vane comprises a trailing portion which is arranged adjacent to a trailing edge of the second guide vane and which is arranged at a first angle with respect to a virtual plane defined by a trailing edge of the first guide vane and the trailing edge of the second guide vane. Specifically, the first angle defined by the trailing portion and the virtual plane is selected such that a fluid flow flowing through the flow channel is controlled in such a manner that the fluid flow exits the flow channel at a desired flow angle with respect to the virtual plane. Typically, the first angle defined by the trailing portion and the virtual plane substantially corresponds to the desired flow angle that the fluid flow, upon exiting the flow channel, defines with the virtual plane.

The trailing surface of the second guide vane further comprises a leading portion which is arranged adjacent to a leading edge of the second guide vane and which is arranged at a second angle with respect to the virtual plane defined by the trailing edge of the first guide vane and the trailing edge of the second guide vane. The second angle is larger than the first angle. Thus, after entering the flow channel, the fluid flow flows along the leading portion and thereby is deflected so as to define a flow angle with the virtual plane that is larger than the desired flow angle of the fluid flow upon exiting the flow channel.

Therefore, the trailing surface of the second guide vane is also provided with an intermediate portion which is arranged between the trailing portion and the leading portion and which is arranged at a third angle with respect to the virtual plane defined by the trailing edge of the first guide vane and the trailing edge of the second guide vane. The third angle is smaller than the first angle. Thus, upon flowing along the intermediate portion, the fluid flow is deflected so as to define a flow angle with the virtual plane that is smaller than the desired flow angle of the fluid flow upon exiting the flow channel.

The above-described design of the trailing surface of the second guide vane allows the leading portion of the trailing surface of the second guide vane to extend at an angle with respect to the virtual plane defined by the trailing edges of the guide vanes that is larger than in prior art designs. As a result, accessibility of the leading portion, for example in order to provide surface finishing to the leading portion or in order to remove a support structure which is built up via an additive manufacturing process for supporting the leading portion during the additive manufacturing process is improved. In dependence on the design of the guide vane arrangement, in some cases support structures may also be avoided altogether. As a result, the guide vane arrangement can be produced in a cost efficient manner by means of an additive manufacturing process.

In particular, the guide vane arrangement can be produced by means of a generative layer-building process from powdered raw materials. Specifically, a raw material powder layer may be applied to a carrier and, depending on the desired geometry of the guide vane arrangement to be created, subjected to laser radiation at selected locations. The laser is controlled by means of CAD data. The laser radiation penetrating the powder layer causes heating and consequently fusion or sintering of the raw material powder particles. Subsequently, successively further raw material powder layers are applied to the already-radiated layer on the carrier until the guide vane arrangement has the desired shape and size. For example, the guide vane arrangement may be composed of metal, in particular titanium or a titanium or a nickel alloy.

Alternatively thereto, the guide vane arrangement may, however, also be made of other metallic materials, such as for example aluminum or steel alloys.

The leading surface of the first guide vane may comprise an inlet portion which is arranged adjacent to a leading edge of the first guide vane and which, with respect to a central axis of the flow channel, is arranged opposite to the leading portion of the trailing surface of the second guide vane. The inlet portion of the leading surface of the first guide vane and the leading portion of the trailing surface of the second guide vane may define a restricting portion of the flow channel. The restricting portion of the flow channel may have a flow cross-section that decreases in a flow direction of the fluid flow flowing through the flow channel. Upon flowing through the restricting portion of the flow channel, the fluid flow is accelerated.

Further, the leading surface of the first guide vane may comprise an outlet portion which is arranged adjacent to a trailing edge of the first guide vane. A projection of the leading portion of the trailing surface of the second guide vane into the virtual plane preferably at least partially coincides with a projection of the outlet portion of the leading surface of the first guide vane into the virtual plane. Thus, when viewed from a direction of the trailing edges of the guide vanes, the leading portion of the trailing surface of the second guide vane is at least partially covered by the outlet portion of the leading surface of the first guide vane.

To the contrary, a projection of the intermediate portion of the trailing surface of the second guide vane into the virtual plane preferably does not coincide with the projection of the outlet portion of the leading surface of the first guide vane into the virtual plane. Alternatively or additionally thereto, also a projection of the trailing portion of the trailing surface of the second guide vane into the virtual plane preferably does not coincide with the projection of the outlet portion of the leading surface of the first guide vane into the virtual plane.

The increased angle of the leading portion with respect to the virtual plane requires the presence of the intermediate portion that extends at an angle with respect to the virtual plane that is even lower than the angle defined between the trailing portion and the virtual plane. However, the above design of the second guide vane ensures that, when viewed from a direction of the trailing edges of the guide vanes, the intermediate portion and/or the trailing portion of the trailing surface of the second guide vane is/are not covered by the outlet portion of the leading surface of the first guide vane and hence are easily accessible, for example for providing surface finishing or for removing a support structure which is built up during additive manufacturing of the guide vane arrangement for supporting the intermediate portion and/or the trailing portion.

The trailing surface of the second guide vane may further comprise a first transition portion which is arranged between the leading portion and the intermediate portion. With respect to the central axis of the flow channel, the first transition portion may be arranged opposite to the outlet portion of the leading surface of the first guide vane. Preferably, the first transition portion, with respect to the central axis of the flow channel, has a convex curvature.

The flow channel defined between the first and the second guide vane of the guide vane arrangement in particular is designed in such a manner that the fluid flow, when exiting the flow channel, flows at a desired first flow speed. The first transition portion and the outlet portion of the leading surface of the first guide vane may define an expansion portion of the flow channel. The expansion portion of the flow channel may have a flow cross-section that increases in the flow direction of the fluid flow flowing through the flow channel. Upon flowing through the expansion portion of the flow channel, the fluid flow is accelerated. The expansion portion defined by the first transition portion and the outlet portion of the leading surface of the first guide vane, however, may be designed in such a manner that the fluid flow, upon flowing through the expansion portion, is accelerated to a second flow speed that is higher than the desired first flow speed. Thus, the expansion portion provides for an over-expansion of the fluid flow.

The trailing surface of the second guide vane preferably further comprises a second transition portion which is arranged between the intermediate portion and the trailing portion. The second transition portion, with respect to the central axis of the flow channel, preferably has a concave curvature. In a preferred embodiment of the guide vane arrangement, the second transition portion defines a recompression portion of the flow channel which has a flow cross-section that decreases in the flow direction of the fluid flow flowing through the flow channel. In particular, the recompression portion defined by the second transition portion is designed in such a manner that the fluid flow upon flowing through the recompression portion is decelerated from the second speed at which the fluid flow flows upon exiting the expansion portion and while flowing along the intermediate portion of the trailing surface of the second guide vane to the desired first flow speed at the outlet of the flow channel. The aim is to produce an average design flow speed and average design angle at the outlet plane P, defined by trailing edges 30 and 34. The values of $\alpha_{inter}$ and $\alpha_{out}$ must be set so as to attain the desired average value of both outlet flow angle and outlet speed.

In a preferred embodiment of the guide vane arrangement, the second angle, i.e. the angle which is defined by the leading portion of the trailing surface of the second guide vane and the virtual plane defined by the trailing edges of the first and the second guide vane, is selected so as to allow manufacturing of the leading portion by an additive manufacturing process without being supported by a removable support structure. Preferably, the second angle is larger than 25°, in particular larger than 30°, and in particular preferably larger than 35°. By designing the leading portion of the trailing surface of the second guide vane in such a manner that it does no longer require support during additive manufacturing of the guide vane arrangement, the efficiency of the additive manufacturing process can be further enhanced.

The first angle which is defined by the trailing portion of the trailing surface of the second guide vane and the virtual plane defined by the trailing edges of the first and the second guide vane preferably is in the range of 10 to 35° or 15 to 35°, preferably in the range of 20 to 30° and in particular approximately 25°. The second angle which is defined by the leading portion of the trailing surface of the second guide vane and the virtual plane defined by the trailing edges of the first and the second guide vane preferably is in a range of 50 to 70°, preferably in the range of 55 to 65° and in particular approximately 60°. The third angle which is defined by the intermediate portion of the trailing surface of the second guide vane and the virtual plane defined by the trailing edges of the first and the second guide vane preferably is in a range of 1 to 15° or 5 to 15°, preferably in the range of 7 to 13° and in particular approximately 10°.

In a particularly preferred embodiment of the guide vane arrangement, the first and the second guide vane are formed integral with each other and with a carrier structure. The carrier structure may, for example, be defined by a turbine manifold and/or a turbine housing. The guide vanes may be attached adjacent to each other to the carrier structure so as to define the guide vane arrangement. In particular, the one-piece guide vane arrangement comprising the carrier structure and the guide vanes, preferably a plurality of first and second guide vanes, is produced via an additive manufacturing process.

In a method of operating a guide vane arrangement a fluid flow is supplied to a flow channel defined between a leading surface of a first guide vane and a trailing surface of a second guide vane. The fluid flow is guided along a trailing portion of the trailing surface of the second guide vane which is arranged adjacent to a trailing edge of the second guide vane and thereby deflected such that the fluid flow exits the flow channel at a first flow angle with respect to a virtual plane defined by a trailing edge of the first guide vane and the trailing edge of the second guide vane. Prior to being guided along the trailing portion of the trailing surface, the fluid flow is guided along a leading portion of the trailing surface of the second guide vane which is arranged adjacent to a leading edge of the second guide vane and thereby deflected such that the fluid flow flows at a second flow angle with respect to the virtual plane defined by the trailing edge of the first guide vane and the trailing edge of the second guide vane. The second flow angle is larger than the first flow angle. Thereafter, the fluid flow is guided along an intermediate portion of the trailing surface of the second guide vane which is arranged between the trailing portion and the leading portion and thereby deflected such that the fluid flow flows at a third flow angle with respect to the virtual plane defined by the trailing edge of the first guide vane and the trailing edge of the second guide vane. The third flow angle is smaller than the first flow angle.

The leading surface of the first guide vane preferably comprises an inlet portion which is arranged adjacent to a leading edge of the first guide vane and which, with respect to a central axis of the flow channel, is arranged opposite to the leading portion of the trailing surface of the second guide vane. A flow speed of the fluid flow, upon being guided through a restricting portion of the flow channel which is defined by the inlet portion of the leading surface of the first guide vane and the leading portion of the trailing surface of the second guide vane and which has a flow cross-section that decreases in a flow direction of the fluid flow flowing through the flow channel, may be accelerated.

The trailing surface of the second guide vane preferably further comprises a first transition portion which is arranged between the leading portion and the intermediate portion, which with respect to the central axis of the flow channel, is arranged opposite to an outlet portion of the leading surface of the first guide vane which is arranged adjacent to a trailing edge of the first guide vane, and/or which with respect to the central axis of the flow channel, has a convex curvature. The flow speed of the fluid flow within the flow channel preferably is controlled in such a manner that the fluid flow, when exiting the flow channel, flows at a desired first flow speed. The flow speed of the fluid flow, upon being guided through an expansion portion of the flow channel which is defined by the first transition portion and the outlet portion of the leading surface of the first guide vane and which has a flow cross-section that increases in the flow direction of the fluid flow flowing through the flow channel, preferably is accelerated to a second flow speed that is higher than the desired first flow speed.

The trailing surface of the second guide vane preferably further comprises a second transition portion which is arranged between the intermediate portion and the trailing portion and/or which, with respect to the central axis of the flow channel, has a concave curvature. The flow speed of the fluid flow, upon being guided through a recompression portion of the flow channel which is defined by the second transition portion and which has a flow cross-section that decreases in the flow direction of the fluid flow flowing through the flow channel, preferably is decelerated to the desired first flow speed.

In a method of manufacturing an above-described guide vane arrangement, the guide vane arrangement is manufactured by an additive manufacturing process.

Upon layer-wise built up of the guide vane arrangement, at least the intermediate portion and optionally also the trailing portion may be supported by a supporting structure.

After completion of the layer-wise built up of the guide vane arrangement, the supporting structure may be removed.

Turbine which is in particular suitable for use in a turbo pump comprises an above-described guide vane arrangement.

A preferred embodiment of the invention will now be explained in more detail with the aid of the appended, schematic drawing, of which

DETAILED DESCRIPTION OF THE DRAWINGS

Figure 1:
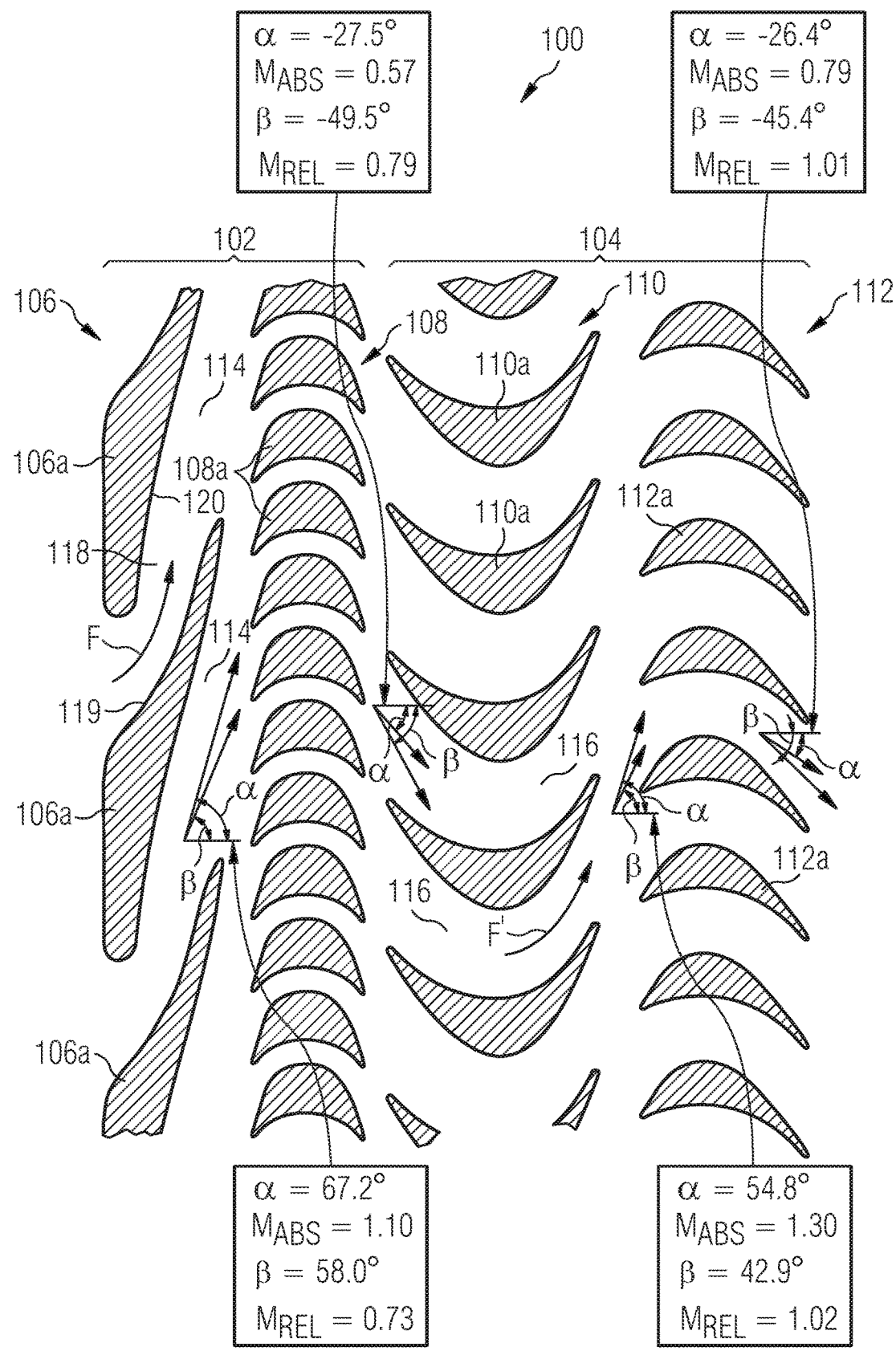
FIG. 1 shows a two-stage turbine according to the prior art.

FIG. 1 shows a conventional two-stage turbine 100 comprising a first stage 102 and a second stage 104. The first turbine stage 102 comprises a first guide vane arrangement 106 having a plurality of first guide vanes 106*a* and a first rotor 108 having a plurality of first rotor blades 108*a*. The second turbine stage 104 comprises a second guide vane arrangement 110 having a plurality of second guide vanes 110*a* and a second rotor 112 having a plurality of second rotor blades 112*a*. While the guide vanes 106*a*, 110*a* of the first and the second guide vane arrangement 106, 110 are stationary mounted in a turbine manifold and/or a turbine housing (not shown), the rotor blades 108*a*, 112*a* of the first and the second rotor 108, 112 are attached to the rotatable shaft (not shown) and thus are rotatable with respect to the turbine manifold and/or the turbine housing when a fluid flow F impinges on the rotor blades 108*a*, 112*a* so as to drive the turbine rotors 108, 112.

The first guide vane arrangement 106 serves to control the fluid flow F supplied to the first rotor 108. Specifically, the fluid flow F, upon being directed through channels 114 defined between adjacent guide vanes 106*a* of the first guide vane arrangement 106, is deflected and accelerated in such a manner that the fluid flow F is supplied to the rotor blades 108*a* of the first rotor 108 at an angle and at a flow speed that allows the first rotor 108 to be driven at its design conditions. In a similar manner, the second guide vane arrangement 110 serves to control a fluid flow F' supplied to the second rotor 112. Specifically, the fluid flow F', upon being directed through channels 116 defined between adjacent guide vanes 110*a* of the second guide vane arrangement 110, is deflected and may be accelerated in such a manner that the fluid flow F is supplied to the rotor blades 112*a* of the second rotor 112 at a flow angle and at a flow speed that allows second rotor 112 to be driven at its design conditions.

The deflection and the acceleration of the fluid flow F, F' within the channels 114, 116 of the guide vane arrangements 106, 110 depends on the design of the guide vane arrangements 106, 110, i.e. on the shape and the dimensions of the individual guide vanes 106a, 110a as well as on the spacing between adjacent guide vanes 106a, 110a. In the first guide vane arrangement 106, the channel 114 defined between adjacent guide vanes 106a comprises a flow expansion region 118 defined between a portion of a leading surface 119 of one guide vane 106a and a portion of a trailing surface 120 of an adjacent guide vane 106a. Upon flowing through the flow expansion region 118, the fluid flow F to be supplied to the first rotor 108 is accelerated to the desired speed, in the example shown in the drawings $M_{ABS}=1.10/M_{REL}=0.73$.

Figure 2:
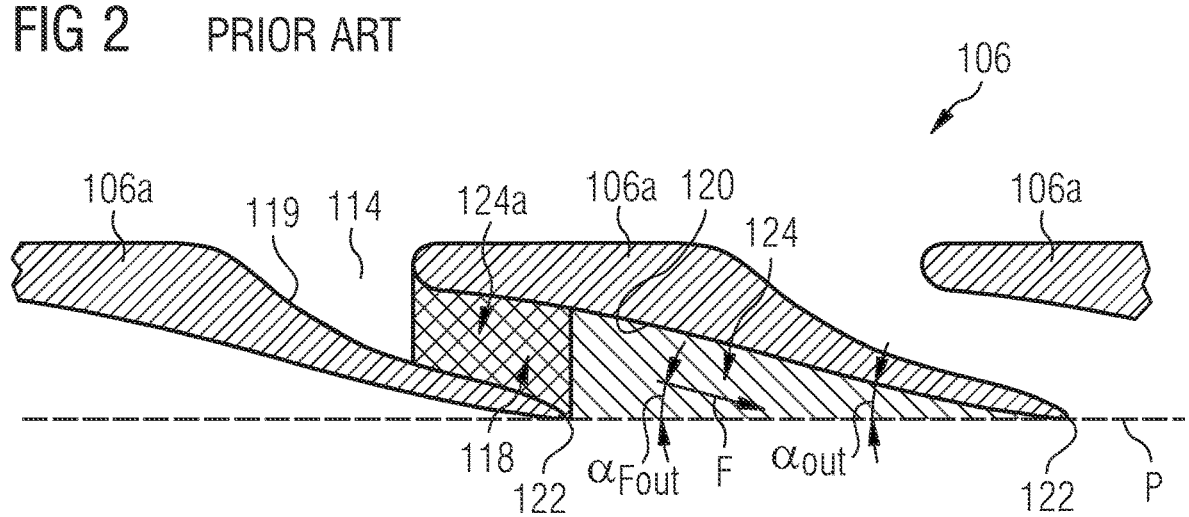
FIG. 2 shows a guide vane arrangement of the turbine according to FIG. 1, wherein the guide vane arrangement is rotated by 90°.

Additionally, as becomes apparent from FIG. 2, the fluid flow F is deflected in such a manner that it exits the flow channel 114 at a flow angle $\alpha_{Fout}$ defined between the fluid flow F and a virtual plane P defined by trailing edges 122 of the guide vanes 106a. Typically, the flow angle $\alpha_{Fout}$ defined between the fluid flow F and the virtual plane P substantially corresponds to an angle $\alpha_{out}$ defined between the trailing surfaces 120 of the guide vanes 106a and the virtual plane P defined by the trailing edges 122 of the guide vanes 106a. In the exemplary turbine 100 shown in FIG. 1, the fluid flow F exiting the first guide vane arrangement 106 at a flow angle $\alpha_{Fout}$ of approximately 20° ensures that the fluid flow F is supplied to the rotor blades 108a of the first rotor 108 at the desired flow angles of $\alpha=67.2°$ and $\beta=58.0°$.

In the first guide vane arrangement 106, the angle $\alpha_{out}$ defined between the trailing surface 120 of the guide vanes 106a and the virtual plane P defined by trailing edges 122 of the guide vanes 106a is approximately 15°, i.e. <25°. It may, however, also be the case that the angle is greater than 25°. As a result, producing the first guide vane arrangement 106 by means of an additive manufacturing process requires the provision of support structures that in FIG. 2 is designated with the reference numeral 124. In particular a portion 124a of the support structures 124 which extends in and adjacent to the flow expansion region 118 of the channel 114, due to the small flow cross-section of the channel 114, is very difficult to remove.

Figure 3:
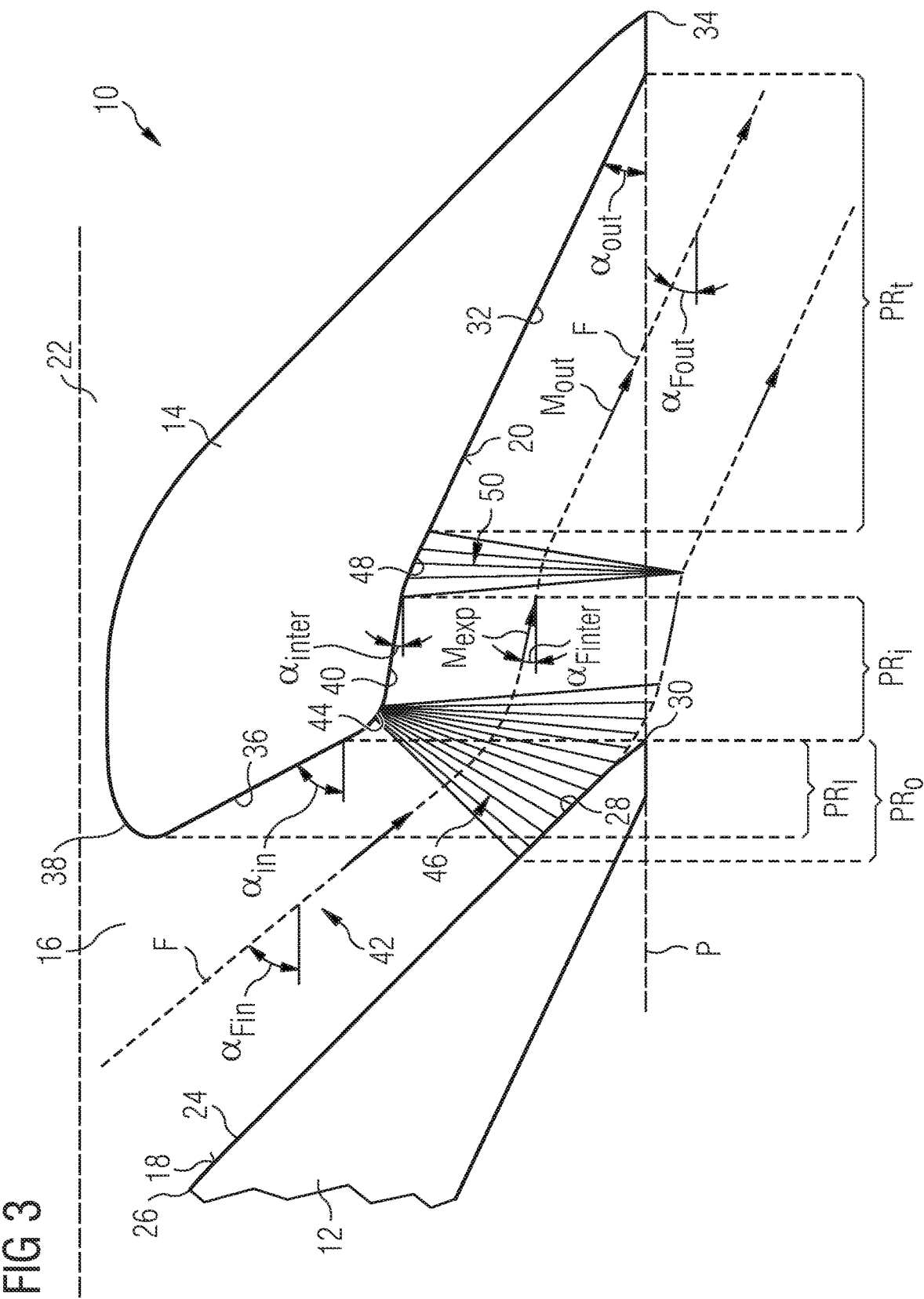
FIG. 3 shows a guide vane arrangement according to the invention.

A guide vane arrangement 10 according to the invention is depicted in FIG. 3. The guide vane arrangement 10 comprises a first guide vane 12 and a second guide vane 14. The second guide vane 14 is arranged adjacent to the first guide vane 12 such that a flow channel 16 is defined between a leading surface 18 of the first guide vane 12 and a trailing surface 20 of the second guide vane 14. The flow channel 16 serves to guide a fluid flow F to rotor blades of a rotor which, when the guide vane arrangement 10 is installed in a turbine, is installed downstream of the guide vane arrangement 10.

FIG. 3 shows only a single first guide vane 12 and only a single second guide vane 14. The guide vane arrangement 10, however, is provided with a plurality of first and second guide vanes 12, 14 which are arranged adjacent to each other so as to define a plurality of flow channels 114. The guide vanes 12, 14 of the guide vane arrangement 10 are identically shaped and dimensioned. Thus, the guide vane which in the arrangement of FIG. 3 constitutes the first guide vane 12 with respect to the second guide vane 14 arranged on the right-hand side of the first guide vane 12 with respect to another guide vane arranged on the left-hand side of the first guide vane 12 (not shown in FIG. 3) constitutes a second guide vane.

The first and the second guide vane 12, 14 are formed integral with each other and with a carrier structure 22 which in FIG. 3 is schematically indicated by a dotted line. The carrier structure 22 may, for example be designed in the form of a rotation-symmetric turbine manifold and/or turbine housing to which the individual guide vanes 12, 14 of the guide vane arrangement 10 are attached so as to define a guide grid for the fluid flow F to be supplied to the rotor to be installed in a turbine downstream of the guide vane arrangement 10.

The leading surface 18 of the first guide vane 12 comprises an inlet portion 24 which is arranged adjacent to a leading edge 26 of the first guide vane 12 and an outlet portion 28 which is arranged adjacent to a trailing edge 30 of the first guide vane 12. The trailing surface 20 of the second guide vane 14 which, together with the leading surface 18 of the first guide vane 12, defines the flow channel 16, comprises a trailing portion 32 arranged adjacent to a trailing edge 34 of the second guide vane 14, a leading portion 36 arranged adjacent to a leading edge 38 of the second guide vane 14 and an intermediate portion 40 arranged between the trailing portion 32 and the leading portion 36.

The inlet portion 24 of the leading surface 18 of the first guide vane 12, with respect to a central axis C of flow channel 18, is arranged opposite to the leading portion 36 of the trailing surface 20 of the second guide vane 14 and, together with the leading portion 36 of the trailing surface 20 of the second guide vane 14, defines a restricting portion 42 of the flow channel 16. The restricting portion 42 of the flow channel 16 has a flow cross-section that decreases in a flow direction of the fluid flow F flowing through flow channel 16. Thus, the fluid flow F, upon being guided through the restricting portion 42, is accelerated, i.e. when exiting the restricting portion 42 the fluid flow F has a flow speed that is higher than the flow speed of the fluid flow F upon entering the flow channel 16 in the region of the leading edges 26, 38 of the first and the second guide vane 12, 14.

As becomes apparent from FIG. 3, the trailing portion 32 of the trailing surface 20 of the second guide vane 14 extends at a first angle $\alpha_{out}$ with respect to a virtual plane P defined by the trailing edges 30, 34 of the first and the second guide vane 12, 14. During operation of the guide vane arrangement 10, the fluid flow F is guided along the trailing portion 32 and thereby is deflected such that the fluid flow F exits the flow channel 16 at a first flow angle $\alpha_{Fout}$ with respect to the virtual plane P which substantially corresponds to the first angle $\alpha_{out}$.

The leading portion 36 of the trailing surface 20 of the second guide vane 14 extends at a second angle $\alpha_{in}$, with respect to the virtual plane P defined by the trailing edges 30, 34 of the first and the second guide vane 12, 14. During operation of the guide vane arrangement 10, the fluid flow F, prior to being guided along the trailing portion 32, is guided along the leading portion 36 and thereby deflected such that the fluid flow F, in the region of the leading portion 36 flows at a second flow angle $\alpha_{Fin}$, with respect to the virtual plane P which substantially corresponds to the second angle $\alpha_{in}$.

The intermediate portion 40 of the trailing surface 20 of the second guide vane 14 extends at a third angle $\alpha_{inter}$ with respect to the virtual plane P defined by the trailing edges 30, 34 of the first and the second guide vane 12, 14. During operation of the guide vane arrangement 10, the fluid flow F is guided along the intermediate portion 40 and thereby deflected such that the fluid flow F, in the region of the intermediate portion 40 flows at a third flow angle $\alpha_{Finter}$ with respect to the virtual plane P which substantially corresponds to the third angle $\alpha_{inter}$.

The second angle $\alpha_{in}$ is larger than the first angle $\alpha_{out}$ and the third angle $\alpha_{inter}$ is smaller than the first angle $\alpha_{out}$. Similarly, the second flow angle $\alpha_{Fin}$ is larger than the first flow angle $\alpha_{Fout}$ and the third flow angle $\alpha_{Finter}$ is smaller than the first flow angle $\alpha_{Fout}$. In the exemplary embodiment of a guide vane arrangement 10 depicted in FIG. 3, the first angle $\alpha_{out}$ and the first flow angle $\alpha_{Fout}$ are approximately 25°, the second angle $\alpha_{in}$ and the second flow angle $\alpha_{Fin}$ are approximately 60°, and the third angle $\alpha_{inter}$ and third flow angle $\alpha_{Finter}$ are approximately 10°.

Further, the guide vanes 12, 14 are designed and arranged relative to each other such that a projection $PR_l$ of the leading portion 36 of the trailing surface 20 of the second guide vane 14 into the virtual plane P substantially coincides with a projection $PR_o$ of the outlet portion 28 of the leading surface 18 of the first guide vane 12 into the virtual plane P, whereas projections $PR_i$, $PR_t$ of the intermediate portion 40 and the trailing portion 32 of the trailing surface 20 of the second guide vane 14 into the virtual plane P do not coincide with the projection of the outlet portion 28 of the leading surface 18 of the first guide vane 12 into the virtual plane P. Thus, when viewed from a direction of the trailing edges 30, 34 of the guide vanes 12, 14, only the leading portion 36 of the trailing surface 20 of the second guide vane 14 is covered by the outlet portion 28 of the leading surface 18 of the first guide vane 14, whereas the intermediate portion 40 and the trailing portion 32 of the trailing surface 20 of the second guide vane 14 are freely accessible.

The trailing surface 20 of the second guide vane 14 further is provided with a first transition portion 44. The first transition portion 44 is arranged between the leading portion 36 and the intermediate portion 40 and, with respect to the central axis C of the flow channel 16, arranged opposite to the outlet portion 28 of the leading surface 18 of the first guide vane 12. With respect to the central axis C of the flow channel 16, the first transition portion 44 has a convex curvature. The first transition portion 44 and the outlet portion 28 of the leading surface 18 of the first guide vane 12 define an expansion portion 46 of the flow channel 16 which has a flow cross-section that increases in the flow direction of the fluid flow F.

The flow channel 16 in general has a design which ensures that the fluid flow F, upon exiting the flow channel 16, flows at a desired first flow speed $M_{out}$. The expansion portion 46, however, is designed in such a manner that the fluid flow F, upon flowing the expansion portion 46, is accelerated to a second flow speed $M_{exp}$ that is higher than the desired first flow speed $M_{out}$. In other words, the expansion portion 46 provides for an over-expansion of the fluid flow F.

Finally, the trailing surface 20 of the second guide vane 14 is provided with a second transition portion 48 which is arranged between the intermediate portion 40 and the trailing portion 32 and which, with respect to the central axis C of the flow channel 16, has a concave curvature. The guide vane arrangement 10 may also be designed with a gradual curve extending along the whole length of the trailing surface 20 between 44 and the trailing edge 34. In that case, portions 40 and 32 will collapse to a point, and angles $\alpha_{inter}$ and $\alpha_{out}$ define the wall inclination at the start and the end of transition portion 48.

The second transition portion 48 defines a recompression portion 50 which has a flow cross-section that decreases in the flow direction of the fluid flow F flowing through the fluid channel 16. The recompression portion 50 is designed in such a manner that the fluid flow F, upon flowing through the recompression portion 50, is decelerated to the desired first flow speed $M_{out}$. Thus, the recompression portion 50 provides for a compensation of the over-expansion of the fluid flow F in the expansion portion 46.

During operation of the guide vane arrangement 10, the restriction portion 42, the expansion portion 46 and the recompression portion 50 control the flow speed of the fluid flow F so as to ensure that the fluid flow F exits the flow channel 16 at the desired first flow speed $M_{out}$. At the same time, the design of the guide vanes 12, 14 allows manufacturing of the guide vane arrangement 10 by means of an additive manufacturing process. In particular, the second angle $\alpha_{in}$, which in the exemplary embodiment of a guide vane arrangement 10 shown in FIG. 3 is approximately 60°, allows manufacturing of the leading portion 36 of the trailing surface 20 of the second guide vane 14 by an additive manufacturing process without being supported by support structures. Thus, a step of removing support structures which, due to the coverage of the leading portion 36 of the trailing surface 20 of the second guide vane 14 by the outlet portion 28 of leading surface 18 of the first guide vane 12, is difficult to access can be dispensed with.

To the contrary, upon layer-wise built up of the guide vane arrangement 10 in an additive manufacturing process, at least the low-angled intermediate portion 40 and, if necessary, also the trailing portion 32 of the trailing surface 20 of the second guide vane 14 are supported by a removable supporting structure S. The supporting structure S, however, is easy to remove after completion of the layer-wise built up of the guide vane arrangement 10, since the design of the guide vane arrangement 10 allows an unhindered access to the intermediate portion 40 and the trailing portion 32 of the trailing surface 20 of the second guide vane 14. By means of additive manufacturing, the carrier structure 22 and the guide vanes 12, 14 can be manufactured in one piece.

The guide vane arrangement 10 according to the invention as depicted in FIG. 3 is suitable for use in supersonic turbines, and using the same basic principle (adjusting the contour along the trailing surface 20 to obtain an average design flow speed and average design angle at the outlet plane P, defined by trailing edges 30 and 34) can be applied for subsonic turbines as well.

What is claimed is:

1. A turbine configured for use in a turbo pump, comprising:
 a turbine rotor; and
 a guide vane arrangement arranged upstream of the turbine rotor, wherein the guide vane arrangement comprises:
  a first guide vane; and
  a second guide vane, wherein the second guide vane is arranged adjacent to the first guide vane such that a flow channel is defined between a leading surface of the first guide vane and a trailing surface of the second guide vane, and wherein the trailing surface of the second guide vane comprises:
   a trailing portion which is arranged adjacent to a trailing edge of the second guide vane and which is arranged at a first angle with respect to a virtual plane defined by a trailing edge of the first guide vane and the trailing edge of the second guide vane,
   a leading portion which is arranged adjacent to a leading edge of the second guide vane and which is arranged at a second angle with respect to the virtual plane defined by the trailing edge of the first guide vane and the trailing edge of the second guide vane, the second angle being larger than the first angle, and an intermediate portion which is arranged between the trailing portion and the leading portion and which is arranged at a third angle with respect to the virtual plane defined by the trailing edge of the first guide vane and the trailing edge of the second guide vane, the third angle being smaller than the first angle.

2. The turbine of claim 1, wherein the leading surface of the first guide vane comprises one or more of:

an inlet portion which is arranged adjacent to a leading edge of the first guide vane and which, with respect to a central axis of the flow channel, is arranged opposite to the leading portion of the trailing surface of the second guide vane, and an outlet portion which is arranged adjacent to a trailing edge of the first guide vane.

3. The turbine of claim 2, wherein a projection of the intermediate portion and/or of the trailing portion of the trailing surface of the second guide vane into the virtual plane does not coincide with the projection of outlet portion of the leading surface of the first guide vane into the virtual plane.

4. The turbine of claim 2, wherein the leading surface of the first vane guide comprises at least one of:

the inlet portion, wherein the inlet portion of the leading surface of the first guide vane and the leading portion of the trailing surface of the second guide vane define a restricting portion of the flow channel which has a flow cross-section that decreases in a flow direction of the fluid flow flowing through the flow channel, and the outlet portion, wherein a projection of the leading portion of the trailing surface of the second guide vane into the virtual plane at least partially coincides with a projection of the outlet portion of the leading surface of the first guide vane into the virtual plane.

5. The turbine of claim 1, wherein the trailing surface of the second guide vane further comprises a first transition portion, which is arranged between the leading portion and the intermediate portion, which, with respect to the central axis of the flow channel, is arranged opposite to the outlet portion of the leading surface of the first guide vane, and/or which with respect to the central axis of the flow channel, has a convex curvature, wherein the flow channel is configured such that the fluid flow, when exiting the flow channel, flows at a desired first flow speed.

6. The turbine of claim 5, wherein the first transition portion and the outlet portion of the leading surface of the first guide vane define an expansion portion of the flow channel which has a flow cross-section that increases in the flow direction of the fluid flow flowing through the flow channel, and wherein the expansion portion in particular is designed in such a manner that the fluid flow, upon flowing through the expansion portion, is accelerated to a second flow speed that is higher than the desired first flow speed.

7. The turbine of claim 1, wherein the trailing surface of the second guide vane further comprises a second transition portion, which is arranged between the intermediate portion and the trailing portion and/or which, with respect to the central axis of the flow channel, has a concave curvature.

8. The turbine of claim 7, wherein the second transition portion defines a recompression portion of the flow channel which has a flow cross-section that decreases in the flow direction of the fluid flow flowing through the flow channel, and wherein the recompression portion in particular is designed in such a manner that the fluid flow, upon flowing through the recompression portion, is decelerated to the desired first flow speed.

9. The turbine of claim 1, wherein the second angle is selected so as to allow manufacturing of the leading portion of the trailing surface of the second guide vane by an additive manufacturing process without being supported by a removable support structure, wherein the second angle is larger than 25°.

10. The turbine of claim 1, wherein the first and the second guide vane are formed integral with each other and with a carrier structure, the carrier structure being defined by a turbine manifold and/or a turbine housing.

11. A method of manufacturing a guide vane arrangement according to claim 1, wherein the guide vane arrangement is manufactured by an additive manufacturing process.

12. The method of claim 11, wherein, upon layer-wise built up of the guide vane arrangement, at least the intermediate portion is supported by a supporting structure.

13. The method of claim 12, comprising removing the supporting structure after completion of the layer-wise built up of the guide vane arrangement.

14. The method of claim 12, wherein, upon layer-wise built up of the guide vane arrangement, also the trailing portion is supported by a supporting structure.

15. The method of claim 14, comprising removing the supporting structure after completion of the layer-wise built up of the guide vane arrangement.

16. A method of operating a turbine configured for use in a turbo pump, wherein the turbine includes a guide vane arrangement arranged upstream of a turbine rotor, the method comprising:

supplying a fluid flow from upstream of the turbine rotor to a flow channel defined between a leading surface of a first guide vane and a trailing surface of a second guide vane of the guide vane arrangement; and guiding the fluid flow along a trailing portion of the trailing surface of the second guide vane which is arranged adjacent to a trailing edge of the second guide vane and thereby deflecting the fluid flow such that the fluid flow exits the flow channel at a first flow angle with respect to a virtual plane defined by a trailing edge of the first guide vane and the trailing edge of the second guide vane, wherein the fluid flow, prior to being guided along the trailing portion of the trailing surface, is guided, along a leading portion of the trailing surface of the second guide vane which is arranged adjacent to a leading edge of the second guide vane and thereby deflected such that the fluid flow flows at a second flow angle with respect to the virtual plane defined by the trailing edge of the first guide vane and the trailing edge of the second guide vane, the second flow angle being larger than the first flow angle, and thereafter is guided along an intermediate portion of the trailing surface of the second guide vane which is arranged between the trailing portion and the leading portion and thereby deflected such that the fluid flow flows at a third flow angle with respect to the virtual plane defined by the trailing edge of the first guide vane and the trailing edge of the second guide vane, the third flow angle being smaller than the first flow angle.

17. The method of claim 16, wherein the leading surface of the first guide vane comprises an inlet portion which is arranged adjacent to a leading edge of the first guide vane and which, with respect to a central axis of the flow channel, is arranged opposite to the leading portion of the trailing surface of the second guide vane, and wherein a flow speed of the fluid flow, upon being guided through a restricting portion of the flow channel which is defined by the inlet portion of the leading surface of the first guide vane and the leading portion of the trailing surface of the second guide vane and which has a flow cross-section that decreases in a flow direction of the fluid flow flowing through the flow channel, is accelerated.

18. The method of claim 16,
wherein the trailing surface of the second guide vane further comprises a first transition portion, which is arranged between the leading portion and the intermediate portion, which, with respect to the central axis of the flow channel, is arranged opposite to an outlet portion of the leading surface of the first guide vane which is arranged adjacent to a trailing edge of the first guide vane, and/or which with respect to the central axis of the flow channel, has a convex curvature,
wherein the flow speed of the fluid flow within the flow channel is controlled such that the fluid flow, when exiting the flow channel, flows at a desired first flow speed, and wherein the flow speed of the fluid flow, upon being guided through an expansion portion of the flow channel which is defined by the first transition portion and the outlet portion of the leading surface of the first guide vane and which has a flow cross-section that increases in the flow direction of the fluid flow flowing through the flow channel, is accelerated to a second flow speed that is higher than the desired first flow speed.

19. The method of claim 16,
wherein the trailing surface of the second guide vane further comprises a second transition portion, which is arranged between the intermediate portion and the trailing portion and/or which, with respect to the central axis of the flow channel, has a concave curvature,
wherein the flow speed of the fluid flow, upon being guided through a recompression portion of the flow channel which is defined by the second transition portion and which has a flow cross-section that decreases in the flow direction of the fluid flow flowing through the flow channel, is decelerated to the desired first flow speed.

* * * * *